United States Patent [19]

Gallottini

[11] 4,265,765

[45] May 5, 1981

[54] VACUUM FILTERBELT APPARATUS

[75] Inventor: Emilio Gallottini, Lodi, Italy

[73] Assignee: Esmil S.p.A., Milan, Italy

[21] Appl. No.: 128,564

[22] Filed: Mar. 10, 1980

Related U.S. Application Data

[63] Continuation of Ser. No. 3,399, Jan. 12, 1979, abandoned.

[30] Foreign Application Priority Data

Jan. 10, 1978 [IT] Italy .................................. 67032 A78

[51] Int. Cl.³ .............................................. B01D 33/04
[52] U.S. Cl. ................................................... 210/401
[58] Field of Search ................. 210/77, 400, 401, 160,
210/416 R, 455; 209/307; 162/348, 351, 354

[56] References Cited

U.S. PATENT DOCUMENTS

| | | |
|---|---|---|
| 2,101,042 | 12/1937 | Casey .................................. 210/197 |
| 2,101,109 | 12/1937 | Thomson ........................ 210/400 X |
| 2,377,252 | 5/1945 | Lehrecke ............................. 210/401 |
| 3,104,223 | 9/1963 | Kasuya ................................. 210/400 |
| 3,426,908 | 2/1969 | Davis et al. ......................... 210/401 |
| 4,037,338 | 7/1977 | Berline ............................. 20/401 X |

*Primary Examiner*—William A. Cuchlinski, Jr.
*Attorney, Agent, or Firm*—Stevens, Davis, Miller & Mosher

[57] ABSTRACT

Vacuum filterbelt apparatus has a continuous belt moved by driving means along a continuous path which includes an operative portion at which filtering of material lying on the belt occurs. Apertures in the belt communicate with a slot in the top of a vacuum chamber beneath the belt, to apply suction to the material. At the operative portion, the belt is supported by plates whose upper surfaces have grooves extending in the direction of movement of the belt. Passages through the plates for the supply of lubricant open into these grooves.

6 Claims, 4 Drawing Figures

VACUUM FILTERBELT APPARATUS

This is a continuation of application Ser. No. 3,399 filed Jan. 12, 1979 now abandoned.

BACKGROUND OF THE INVENTION

1. Field of the Invention

This invention relates to vacuum filterbelt apparatus of the type having a continuous belt of resilient material movable by driving means along a continuous path which includes an operative path portion at which the upper face of the belt is concave. Apertures in the belt communicate at the operative path portion with a vacuum chamber beneath the belt, so that suction filtering is effected.

2. Description of the Prior Art

In the art, vacuum filters are often used for displacing liquid from slurry mixtures. A typical example is the production of $H_3PO_4$ from a mixture of phosphate-bearing rock an sulphuric acid. The slurry produced from this reaction consists of gypsum and phosphoric acid, and the phosphoric acid is concentrated and separated from the gypsum by means of the vacuum filter. This technique is known and requires no further explanation, and is mentioned as only one possible application of vacuum filter equipment in general.

The vacuum filterbelt apparatus described above is itself an improvement over the so-called "pan-filters" which consist of a series of separate pans which are each connected to a vacuum equipment, and which are carried round a horizontal circular path like a roundabout (or merry-go-round). Successively the pans, equipped with filters, are filled, evacuated, flushed and emptied by tilting them.

Compared with panfilters, the vacuum filterbelt is an improvement because it does not require periodic tilting movements of pans and consequently runs more smoothly and can be of a lighter construction. Furthermore, access to the filter is better and the undesirable consequences of scaling within the filter are less severe. The belt is at its top surface provided with ribs and grooves. The filtercloth rests on the ribs in the horizontal operative path portion of the belt but is deflected to travel separately from the belt outside the operative path portion, so that it is easily possible to clean the filtercloth and if necessary to remove any solid incrustation from the belt.

In the known apparatus, the belt is supported in the operative path portion by stationary support plates. The belt's own weight presses it against these support plates, so that the belt is guided in a fixed path. The belt also rests on a fixed flange at the top of the vacuum chamber. Passages in the support plates open at the top surface of the support plates. These passages allow water or air to be forced between the moving belt and the support plates, to form a layer of lubricating material or air, which considerably reduces the friction between the belt and the support plates. Thus the drag force on the belt is reduced which permits the driving system and the belt to be lighter in construction. At the same time, energy required for operation of the apparatus is saved.

SUMMARY OF THE INVENTION

It is the object of the invention to provide improved vacuum filterbelt apparatus in which friction between the belt and the support plates is further reduced, resulting in less wear on the belt and reduced energy consumption in operation.

According to the invention, the upper surfaces of the stationary belt support members at the operative path portion have grooves running in the longitudinal direction of the belt (i.e. the direction of movement of the belt). The passages for lubricating agent in the support plates open into the grooves, e.g. at the bottoms of the grooves.

Thus, when air is used as lubricating agent, the presence of the grooves contributes to the formation of an air cushion which more evenly covers the entire surface of the support members, while the shape of the grooves aids the movement of the air of the air cushion.

Good results have been particularly obtained if the support plates are manufactured of synthetic material having good frictional properties, for instance polypropylene or polyethylene. In this case, even if the belt still comes into contact with the support members through the lubricating film or air cushion the friction between the belt and the support will yet be relatively slight.

The grooves preferably have a smoothly curved wave-shape as seen in section transverse to said longitudinal direction. This shape is for instance sinusoidal. Suitably, the pitch (i.e. the spacing of adjacent grooves) of the wave-shape is in the range 5 to 15 mm, and preferably about 10 mm.

The support member including its upper surface is formed from a uniformly shaped tile block of synthetic material with side-dimensions of between 40 and 60 cm. Such blocks can be simply and cheaply manufactured, e.g. by a pressure casting process or by extrusion.

BRIEF DESCRIPTION OF THE DRAWINGS

An embodiment of the invention will now be described, by way of example, and with reference to the accompanying drawings. In the drawings.

DESCRIPTION OF THE PREFERRED EMBODIMENT

Figure 1:
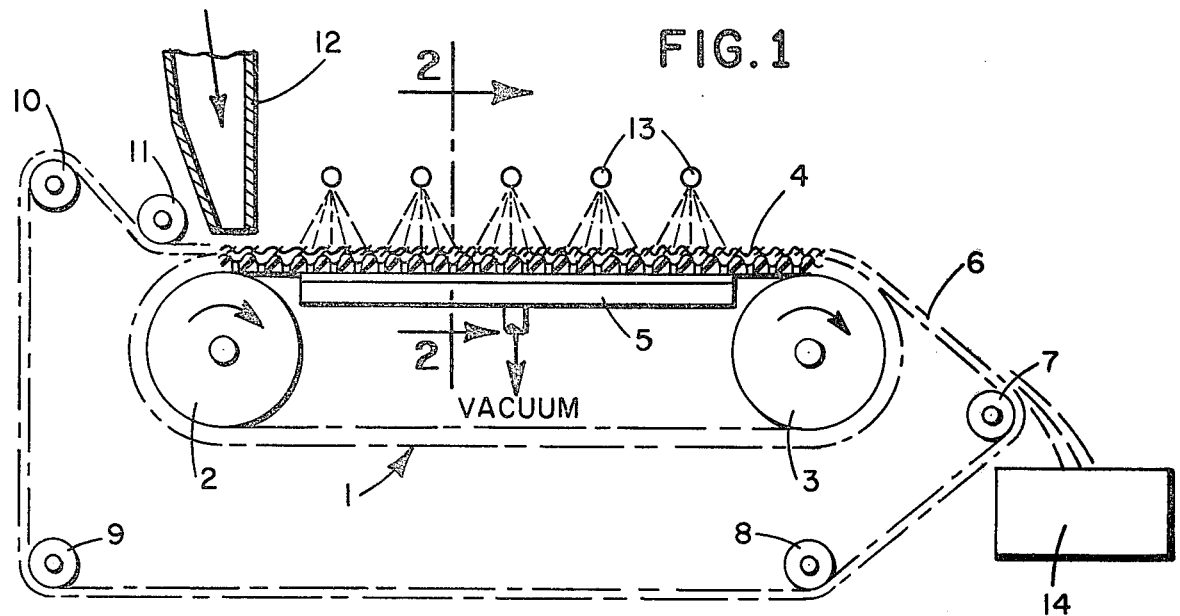
FIG. 1 schematically shows a longitudinal side view of vacuum filterbelt apparatus to which the invention is applicable.

The apparatus of FIG. 1 has an endless belt 1 made of rubber reinforced with canvas. In this particular embodiment, this belt is about 2.5 m in width and about 21 m in length. The belt is guided over turning rolls 2 and 3, at least one of which is driven by a driving mechanism, not shown here.

The top horizontal run 4 of the path of the belt 1 is its operative path portion, beneath which there is a vacuum chamber 5 which is connected to a vacuum pump at several points.

An endless filtercloth 6 extends over and is guided by a plurality of rolls 8 to 11, in such a way that it follows the same path between rolls 2 and 3 as belt 1.

Slurry material to be treated is deposited onto the filtercloth by a feedbox 12 and if desired may subsequently be wetted by means of a plurality of spraying nozzles 13, the number of which in use is determined for the process being performed. The liquid sprayed also depends on the process. The washed slurry or cake lying on the filtercloth is dumped into a collecting tank 14 at the location of the guide roll 7. During the further progress of the belt 1 and the filtercloth 6, both can be cleaned and freed of incrustation as required.

Figure 2:
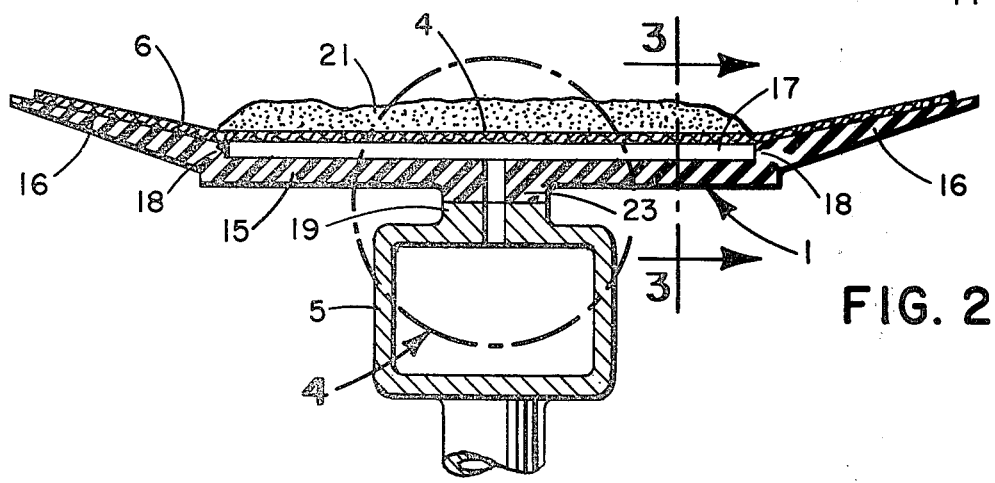
FIG. 2 is a detail on an enlarged scale in cross-section on the line II—II of FIG. 1.

FIG. 2 shows only one possible embodiment of the belt, and other essentially equivalent constructions are possible and are known. The belt 1 consists mainly of a cloth-supporting part 15, and canted flanges 16 at its edges to provide a concave upper surface. At the cloth-supporting part 15, there are ribs 17, extending in a direction transverse to the direction of movement of the belt 1.

Figure 3:
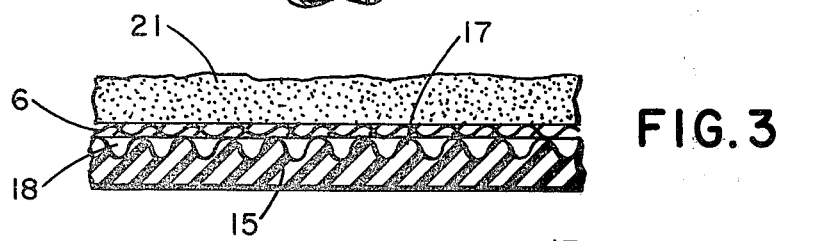
FIG. 3 is a cross section on the line III—III of FIG. 2.

FIG. 3 shows the ribs 17 upon which rest a slurry cake 21 and the filtercloth 6. Liquid passing through the filtercloth is caught in the grooves between the ribs 17, and is removed centrally through apertures in the belt to vacuum chamber 5 (see FIG. 2). FIG. 3 also shows side-containment parts 18 located beneath the center of the cloth-supporting part 15 of the belt 1. These parts are fixed on the belt and slide along flanges 19 provided at the top of the vacuum chamber 5. The difference in pressure between the interior of the vacuum chamber and the environment determines the force with which the parts 18 are pressed against the flanges 19, and thus also the drag force required to overcome this friction resistance.

Figure 4:
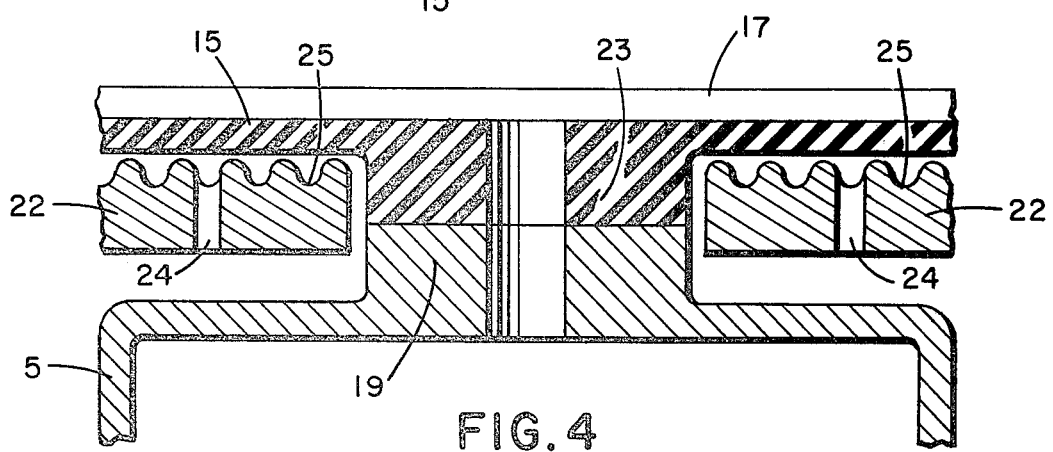
FIG. 4 shows the detail IV of FIG. 2 on an enlarged scale, to illustrate the improvement proposed by the invention.

In FIG. 4, there are shown stationary support plates 22 for the belt 1, which were omitted in FIG. 2 for the sake of simplicity.

In known apparatus, the support plates 22 have smooth top surfaces, and several passages 24 end at these top surfaces, for the transport of lubricant, liquid or air, to these surfaces. In the embodiment according to the invention, the support plates 22 are made of polypropylene blocks which are provided with a smoothly curved wave-shaped top surface, comprising peaks separated by grooves 25. The passages 24 open into the bottom of the grooves 25. The height of the waves is about 5 mm, whilst the distance between two wave crests is 8 mm.

In the case shown, air supply passages 24 are provided in the center of the support plates 22, but it is also possible to have several such passages end at different places in the support plates, or to construct the support plates of separate tile elements, having a supply passage 24. FIG. 4 shows a part which slides on the flanges 19 of the vacuum chamber 5 (see part 18 of FIG. 2) as an integral thickened portion 23 of the belt 1.

As explained above, the grooves 25 cause reduction of friction between the belt 1 and the plates 22, by aiding the distribution of lubricant and the formation of a lubricant layer (e.g. an air cushion).

What is claimed is:

1. In a vacuum filterbelt apparatus comprising a continuous belt, driving means for moving said belt along a continuous path which includes an operative path portion at which the upper face of the belt is concave and apertures extend therethrough, at least one vacuum chamber extending beneath the belt in frictional contact with said belt and in communication with said apertures, whereby suction filtering of material on the belt is effected and independent stationary support members for said belt positioned beneath the belt and spaced from said vacuum chamber surface, said support members defining passages therethrough opening at their upper surfaces for supply of lubricating agent beneath the moving belt, the improvement that the upper surfaces of the support members have grooves running in the longitudinal direction of said belt for the entire length of the supports, the said passages opening into said grooves.

2. Apparatus according to claim 1 wherein the upper surfaces of the support members are formed of a low-friction synthetic material.

3. Apparatus according to claim 1 wherein as seen in section transverse to said longitudinal direction, said grooves have a smoothly curved wave-shape.

4. Apparatus according to claim 3 wherein said wave-shape has a pitch in the range of 5 to 15 mm.

5. Apparatus according to one of claims 1, 2 or 3 wherein the upper surfaces of said support members are provided by blocks of uniform shape having side dimensions in the range of 40 to 60 cm.

6. Vacuum filterbelt apparatus comprising a continuous belt of resilient material having, on one side, a concave face, belt guide means and drive means for moving said belt in a continuous path which path includes an operative path portion at which said belt has its said concave face upwards, independent stationary support plates located beneath said belt at said operative path portion, and each having an upper surface which has grooves extending over its entire length in the longitudinal direction of said belt and having passages opening into said grooves for supply of lubricating agent to said upper surface to reduce frictional drag between said upper surface and the belt, at least one vacuum chamber in frictional contact with said belt located beneath said operative path portion between said support plates and spaced therefrom, said vacuum chamber having at least one aperture at its upper side, the belt having apertures through it which, at said operative path portion, register with said aperture of the vacuum chamber so that suction is applied through the apertures in the belt to material on said upper concave face of the belt.

* * * * *